(12) United States Patent
Crouch et al.

(10) Patent No.: US 7,850,126 B2
(45) Date of Patent: Dec. 14, 2010

(54) LAMINAR FLOW SURFACES WITH SELECTED ROUGHNESS DISTRIBUTIONS, AND ASSOCIATED METHODS

(75) Inventors: Jeffrey D. Crouch, Issaquah, WA (US); Lian L. Ng, Bellevue, WA (US); Mary I. Sutanto, Redmond, WA (US)

(73) Assignee: The Boeing Company, Chicago, IL (US)

( * ) Notice: Subject to any disclaimer, the term of this patent is extended or adjusted under 35 U.S.C. 154(b) by 876 days.

(21) Appl. No.: 11/740,040

(22) Filed: Apr. 25, 2007

(65) Prior Publication Data

US 2008/0265100 A1 Oct. 30, 2008

(51) Int. Cl.
*B64C 21/10* (2006.01)
(52) U.S. Cl. .............. 244/200; 244/133; 244/130; 244/200.1
(58) Field of Classification Search ........... 244/130, 244/133, 200, 200.1
See application file for complete search history.

(56) References Cited

U.S. PATENT DOCUMENTS

| | | | | |
|---|---|---|---|---|
| 2,646,945 | A | * 7/1953 | Perry | 244/204 |
| 4,114,836 | A | * 9/1978 | Graham et al. | 244/1 N |
| 4,575,030 | A | 3/1986 | Gratzer | |
| 4,813,631 | A | 3/1989 | Gratzer | |
| 5,263,667 | A | * 11/1993 | Horstman | 244/209 |
| 5,313,700 | A | 5/1994 | Dorman | |
| 6,027,078 | A | 2/2000 | Crouch et al. | |
| 6,171,704 | B1 | * 1/2001 | Mosser et al. | 428/450 |
| 6,834,830 | B2 | 12/2004 | Fujino | |
| 6,969,029 | B2 | 11/2005 | Crouch et al. | |

(Continued)

FOREIGN PATENT DOCUMENTS

DE 19938317 A1 2/2001

(Continued)

OTHER PUBLICATIONS

Crouch, J.D. et al., "Variable N-Factor Method for Transition Prediction in Three-Dimensional Boundary Layers", pp. 211-216, AIAA Journal, vol. 38, No. 2, Feb. 2000.

(Continued)

*Primary Examiner*—Timothy D Collins
*Assistant Examiner*—Justin Benedik
(74) *Attorney, Agent, or Firm*—Perkins Coie LLP

(57) ABSTRACT

Laminar flow surfaces with selected roughness distributions, and associated methods are disclosed. A representative method for designing an airfoil includes selecting a parameter that includes a flow behavior distribution and/or a surface shape for an airflow surface. Based at least in part on the selected parameter, the method can include (a) selecting a target roughness value and determining a chordwise location forward of which surface roughness is at or below the target roughness value and/or (b) selecting a target chordwise location and determining a roughness value for a region forward of the chordwise location, with the surface roughness at or below the roughness value. In particular embodiments, a percentage of a local chord length of the airfoil over which the roughness is below a target value decreases in a spanwise direction. In another embodiment, the roughness at a particular spanwise location can increase over at least three values, continuously, in a step manner, or otherwise.

15 Claims, 3 Drawing Sheets

U.S. PATENT DOCUMENTS

| | | | |
|---|---|---|---|
| 7,093,792 | B2 | 8/2006 | Fujino et al. |
| 7,152,829 | B2 * | 12/2006 | Bertolotti .................... 244/209 |
| 2009/0083979 | A1 * | 4/2009 | Lebret et al. ............... 29/889.7 |

FOREIGN PATENT DOCUMENTS

| | | |
|---|---|---|
| EP | 1081332 A1 | 3/2001 |
| EP | 1167187 A1 | 1/2002 |
| FR | 2783885 A1 | 3/2000 |

OTHER PUBLICATIONS

Crouch, J.D., "Receptivity of Three-Diminsional Boundary Layers", 10 pgs, AIAA 93-0074, 31st Aerospace Sciences Meeting & Exhibit, Jan. 1993, Reno, NV.

Radeztsky, Jr., R.H. et al., "Effect of Micron Sized Roughness on Transition in Swept-Wing Flows", 14 pgs, AIAA 93-0076, 31st Aerospace Sciences Meeting & Exhibit, Jan. 1993, Reno, NV.

Schrauf, G., "Status and perspectives of laminar flow", pp. 639-644, The Aeronautical Journal, vol. 109, No. 1102, Dec. 2005.

Likhanskii, A.V. et al., "Optimization of Dielectric Barrier Discharge Plasma Actuators Driven by Repetitive Nanosecond Pulses", AIAA 2007-633, 13 pgs, AIAA Aerospace Sciences Meeting and Exhibit, Jan. 2007, Reno, NV.

International Search Report and Written Opinion, International Patent Application No. PCT/US2008/057984, Applicant: The Boeing Company, mailed May 4, 2009, 15 pages.

\* cited by examiner

LAMINAR FLOW SURFACES WITH SELECTED ROUGHNESS DISTRIBUTIONS, AND ASSOCIATED METHODS

TECHNICAL FIELD

The present disclosure is directed to laminar flow surfaces, including wings and other airfoils with selected roughness distributions, and associated methods.

BACKGROUND

Commercial transport aircraft manufacturers are under continual pressure to increase the operating efficiency of passenger and cargo aircraft. A major component of operating costs is aircraft fuel, and a major contributor to aircraft fuel consumption is aerodynamic drag. Accordingly, manufacturers have investigated a myriad of techniques for reducing aircraft drag.

One such technique includes maintaining laminar boundary layer flow over aircraft wetted surfaces, particularly the wings, because the drag associated with laminar flow is typically less than the drag associated with turbulent flow. Laminar flow control techniques typically fall into one of three categories: (a) natural laminar flow control, which relies primarily on aerodynamic shaping to maintain laminar flow, and does not require a powered device to do so, (b) active laminar flow control, which requires a powered device to maintain laminar flow, and (c) hybrid laminar flow control, which is a combination of natural laminar flow control and active laminar flow control. Natural and hybrid laminar flow control techniques have received additional attention recently because they require no power (or at least reduced power) when compared with active laminar flow control techniques.

One of the difficulties associated with achieving laminar flow via any of the foregoing techniques is the potential for degradation in laminar flow performance due to surface roughness. Surface roughness has long been known to play a role in causing transition from laminar flow to turbulent flow on swept aircraft wings. However, the cost of manufacturing a very smooth wing surface, particularly over large regions of the wing, can be prohibitive. Accordingly, there is a need for cost effective techniques for making and operating laminar flow aircraft wings.

SUMMARY

The following summary is provided for the benefit of the reader only, and is not intended to limit in any way the invention as set forth by the claims. Particular aspects of the disclosure are directed to methods for designing an airflow surface, for example, an airfoil surface. One such method includes selecting a parameter that includes at least one of a flow-behavior distribution for an airflow surface and a surface shape for the airflow surface. Based at least in part on the selected parameter, the method can further include performing either or both of the following functions: (a) selecting a target roughness value and determining a chordwise location, forward of which surface roughness is at or below the target roughness value, and (b) selecting a target chordwise location and determining a roughness value for a region forward of the chordwise location where the surface roughness at or below the roughness value. In further particular aspects, selecting the parameter can include selecting a pressure coefficient ($C_p$) distribution, and the method can include iteratively changing the $C_p$ distribution, and, for individual $C_p$ distributions, determining corresponding combinations of roughness values and chordwise locations. The method can further include selecting a particular combination of a roughness value and chordwise location from among the multiple corresponding combinations.

Other aspects are directed to airfoil systems. One such system includes an airfoil surface extending in a chordwise direction and a spanwise direction, with the airfoil surface having a variable roughness. The airfoil surface has individual local chord lengths at corresponding spanwise locations, and is configured so that a percentage of the local chord length over which the roughness is below a target value decreases in the spanwise direction.

Another airfoil system, which also includes an airfoil surface having a variable roughness, has the roughness varying over multiple values in a chordwise direction. For example, at a particular spanwise location, the roughness has a first value at a first chordwise location, a second value greater than the first value at a second chordwise location greater than the first chordwise location, and a third value greater than the second value at a third chordwise location greater than the second chordwise location.

DETAILED DESCRIPTION

Aspects of the present disclosure are directed to laminar flow surfaces with selected roughness distributions, and associated methods, including methods for selecting the characteristics of such surfaces. Several aspects of the disclosure are described in the context of natural laminar flow wings, but it will be understood that, in at least some embodiments, such aspects may apply to surfaces other than wings, and/or may apply to active laminar flow surfaces and/or hybrid laminar flow surfaces. Specific details of certain embodiments are described below with reference to FIGS. 1-5. Several details of structures or processes that are well-known and often associated with such systems and processes are not set forth in the following description for purposes of brevity. Moreover, although the following disclosure sets forth several embodiments of different aspects of the invention, several other embodiments of the invention can have different configurations or different components than those described in this section. Accordingly, the invention may have other embodiments with additional elements and/or without several of the elements described below with reference to FIGS. 1-5.

Figure 1:
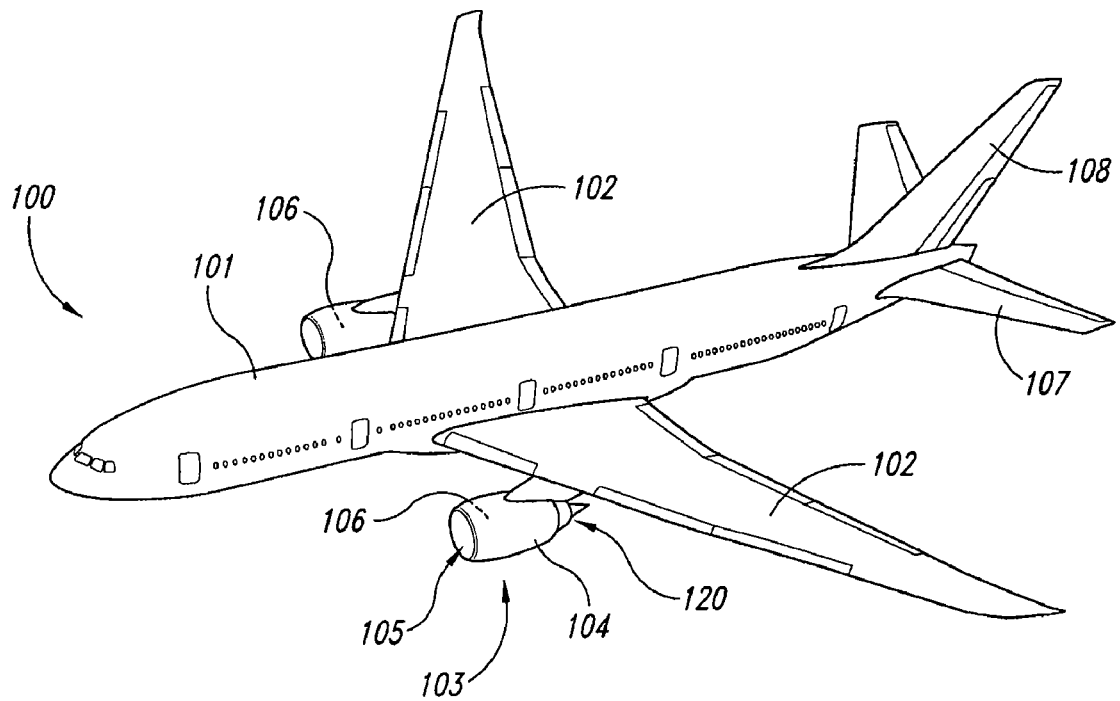
FIG. 1 is an illustration of a representative aircraft having laminar flow surfaces configured in accordance with an embodiment of the invention.

FIG. 1 is an illustration of a commercial jet transport aircraft 100 having swept wings 102, a fuselage 101, and a propulsion system 103. The illustrated propulsion system 103 includes two engines 106 carried by the wings 102. Each engine 106 is housed in a nacelle 104, which includes an inlet 105 and a nozzle 120. A horizontal stabilizer 107 and vertical stabilizer 108 provide for directional stability and control. For purposes of discussion, much of the following description relates to tailoring the surfaces of the wings 102 to achieve natural laminar flow. However, in other embodiments, generally similar or identical techniques can be used to achieve laminar flow over other wetted surfaces, e.g., the fuselage 101, the external surfaces of the nacelle 104, the horizontal stabilizer 107, and/or the vertical stabilizer 108.

For swept wings, there are two modes of flow instability that are typically controlled to maintain non-turbulent (e.g., laminar) flow: Tollmien-Schlichting waves (TSW) and steady cross-flow instabilities (SCF). For a given scale of airplane at prescribed flight conditions, the instabilities are controlled by modifying the boundary layer profiles. This can be done through control of the wing sweep, through control of the pressure distribution over the wing upper surface, through surface suction, or through surface cooling. Natural laminar flow surfaces typically rely only on the wing sweep and the pressure distribution to control the disturbances, because these surfaces do not include powered laminar flow devices.

One of the more difficult aspects of natural laminar flow wing design is controlling SCF. These instabilities grow very rapidly near the leading edge of the wing. The level of SCF amplification depends most strongly on the local chord Reynolds number and the leading-edge sweep angle. The Reynolds number is proportional to the local flow velocity, multiplied by a representative length dimension, and divided by flow viscosity. It is generally expected that for a given Reynolds number (e.g., airplane size, flight speed, and altitude), there is a maximum sweep angle for achieving natural laminar flow. In order to sweep the wing beyond the maximum sweep angle typically associated with natural laminar flow wings, but without adding powered devices (e.g., suction and/or cooling devices), aspects of the present disclosure are directed to controlling surface roughness.

Aspects of the present disclosure use a combination of flow behavior (e.g., pressure gradient) and locally optimized or otherwise controlled surface-quality constraints to achieve natural laminar flow over a large targeted area of the wing at prescribed Reynolds numbers and sweep angle combinations. The downstream boundary of the targeted laminar flow area may be established by practical constraints, including but not limited to surface joints, or it may be a variable that is determined during the design process.

Figure 2:
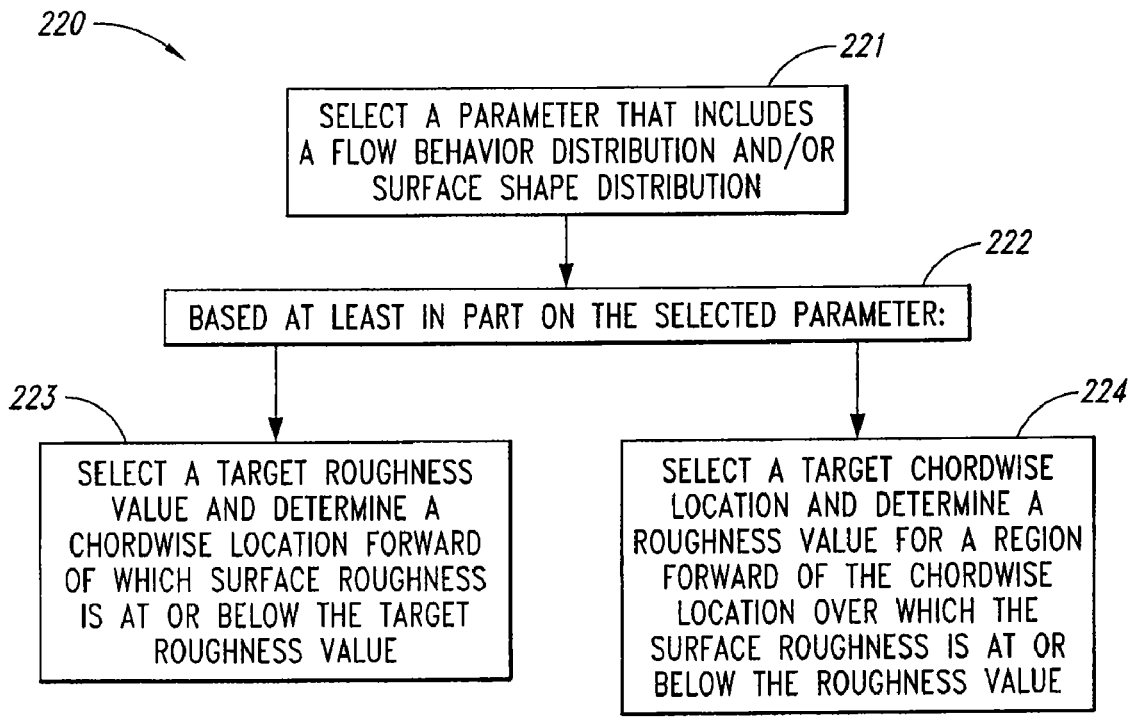
FIG. 2 is a flow diagram illustrating a process for selecting characteristics of an airfoil to produce laminar flow in accordance with an embodiment of the invention.

FIG. 2 is a flow diagram illustrating a process 220 for selecting an airflow surface (e.g., an airfoil surface) that produces laminar flow. In process portion 221, the process 220 includes selecting a flow behavior distribution for flow over the surface, and/or selecting a surface shape distribution. For example, the flow behavior distribution can include a pressure distribution (e.g., a $C_p$ distribution) in a particular embodiment. In other embodiments, the flow behavior distribution can include distributions of other values that are representative of the flow characteristics over the surface. Such distributions include, but are not limited to, Mach number distributions or velocity distributions. Process portion 221 can also include selecting a surface shape, which gives rise to a flow behavior distribution when immersed in a flow (e.g., during flight). For example, a designer can select a surface shape, and the corresponding $C_p$ (or other flow behavior distribution) can be automatically calculated using a computer-based routine, given a proper set of boundary conditions. For purposes of illustration, the following representative description is provided in the context of a $C_p$ distribution, but it will be understood by those of ordinary skill in the relevant art that generally similar techniques can be applied using other flow behavior parameters and/or surface shape distributions.

The flow behavior distribution (e.g., the $C_p$ distribution) can be based on a wide variety of airfoil shapes, and can be selected to produce desirable flow characteristics. In particular, as will be discussed in greater detail below with reference to FIG. 3, the $C_p$ distribution can have a relatively steep rise over the upper surface of the airfoil, followed by a generally flat, aft-extending portion. Such a $C_p$ distribution is expected to be more likely than others to produce laminar flow. This type of $C_p$ distribution narrows the zone over which the roughness can excite the SCF modes, which can cause transition.

In process portion 222, the $C_p$ distribution is used, at least in part, as a basis for selecting further geometric characteristics. These geometric characteristics can include surface roughness values, and associated chordwise and/or spanwise extents over which the surface roughness values are to be maintained. In general, the higher the allowable surface roughness value, the lower the associated manufacturing cost for the surface. Accordingly, there is a desire to minimize the flow area over which surface roughness must be kept at very low values.

In one technique, shown in process portion 223, the designer selects a target roughness value and determines a chordwise location forward of which the surface roughness is at or below the target roughness value. For example, the manufacturer may determine that attempting to achieve a surface roughness below a particular value is cost prohibitive, and may accordingly determine the minimum chordwise extent over which the surface roughness must be maintained at or below the target roughness value.

In another arrangement, shown in process portion 224, the manufacturer selects a chordwise location and determines a roughness value for the region forward of the chordwise location over which the surface roughness is at or below the roughness value. For example, in certain cases, the manufacturer can more readily achieve a very low surface roughness near the wing leading edge, but aft of the forward bulkhead of the wing, fasteners or other structural devices reduce the ability to maintain such a low roughness level. Accordingly, the manufacturer can fix the chordwise location and determine the roughness value rather than the other way around, as was discussed above with reference to process portion 223.

Typically, a given design process includes either process portion 223 or process portion 224. However, in other embodiments, the design process can include both process portions 223 and 224. For example, the manufacturer may wish to conduct a parametric, iterative variation process using each of process portions 223 and 224 and select a design based on the combination of parameters expected to produce a selected (e.g., optimal) result.

Figure 3:
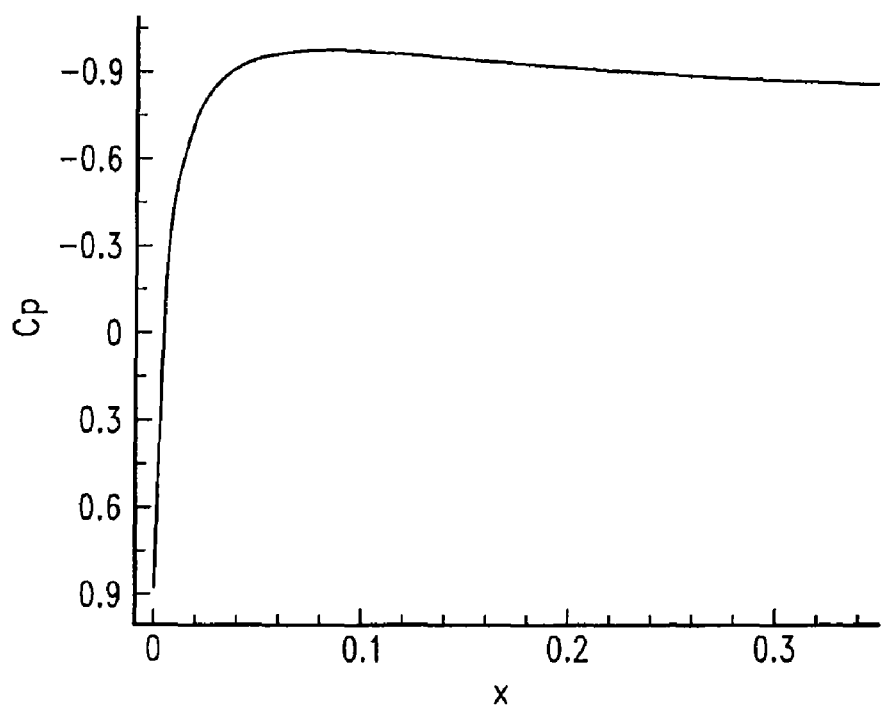
FIG. 3 is a graph illustrating a representative pressure coefficient ($C_p$) distribution in accordance with an embodiment of the invention.

FIG. 3 is a representative graph illustrating $C_p$ as a function of the non-dimensionalized chord length of the wing, with a value of 0.0 corresponding to the wing leading edge, and a value of 1.0 corresponding to the wing trailing edge. Accordingly, FIG. 3 illustrates only the forward one-third or so of the wing. The wing includes a rapid rise in $C_p$ toward the leading edge, followed by a relatively flat "rooftop" $C_p$ distribution. Accordingly, the rapid $C_p$ growth at the leading edge can be designed to reduce and spatially constrain the amplification of SCF. Further aft, the details of the "rooftop" $C_p$ variation are typically generated by requirements to control TSW and to reduce overall wing wave drag. Accordingly, the design of this portion of the wing (e.g., aft of about 5% chord length) can follow guidelines typical of hybrid laminar flow control designs which are generally known to those of ordinary skill in the relevant art, and are accordingly not discussed in detail here.

Figure 4:
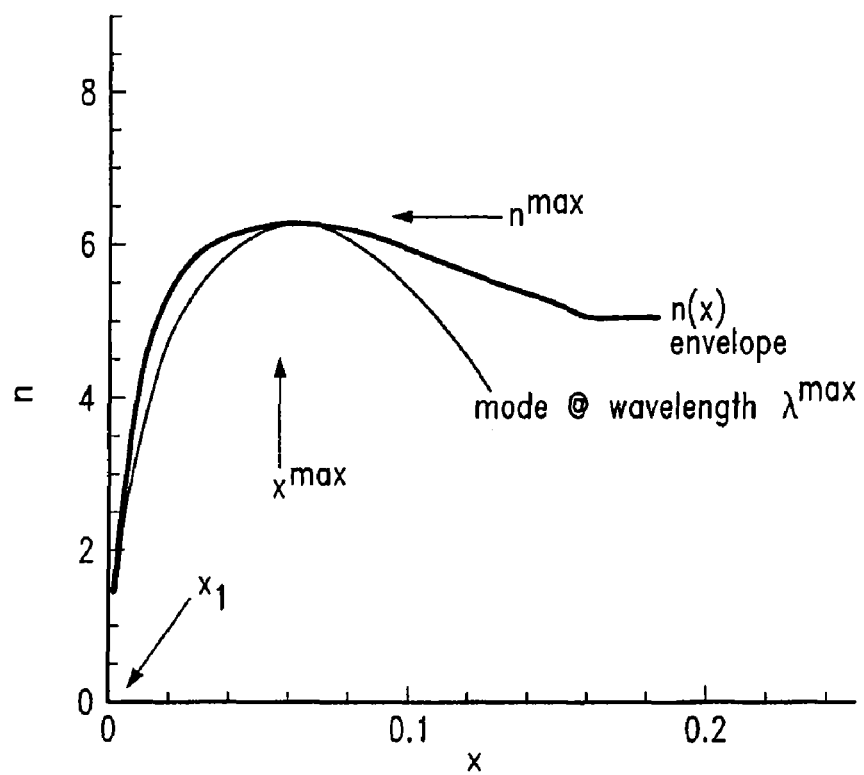
FIG. 4 is a graph illustrating a representative chordwise variation of a cross flow instability amplification factor in accordance with an embodiment of the invention.

The leading edge design shown in FIG. 3 can result in a fairly rapid growth in SCF, reaching a maximum (or becoming relatively flat) just downstream of the initial $C_p$ rise (e.g., at about 5% chord). The exact details of the SCF growth will depend on the Reynolds number and the leading edge sweep angle. For a given wing section (e.g., a streamwise cut through the wing), the SCF growth can be calculated and expressed in terms of a streamwise-varying amplification factor, n(x). FIG. 4 illustrates a graph of n as a function of x. In FIG. 4, the amplification factor n(x) is defined as the envelope of fixed-wavelength, zero-frequency modes of cross-flow instability. The maximum value of n(x) occurs downstream of the initial $C_p$ rise and is labeled $n^{max}$. The chordwise location where n equals $n^{max}$ is referred to as $x^{max}$. If the function for n(x) does not exhibit a maximum before the end of the targeted laminar flow area, the downstream boundary of this area can be assigned $x^{max}$, and $n^{max}$ can accordingly equal the value of n at $x^{max}$. The wavelength of the SCF at the location where n(x) equals $n^{max}$ is referred to as $\lambda^{max}$. The upstream location, where the SCF wavelength $\lambda^{max}$ starts to grow, is referred to as x1. The displacement thickness of the boundary layer at the location x1 is given by $\delta_1^*$.

Transition due to SCF can be avoided if:

$$h_{rms} < \delta_1^* \exp(N_0 - n^{max})$$

where $h_{rms}$ is the root-mean-square measure of the surface roughness at $x_1$, and $N_0$ is a constant obtained from theory and/or experiment. A representative value for $N_0$ is 2.3 (Crouch & Ng, 2000), but this is based on n-factor curves other than those shown in FIG. 2 and accordingly may be different for particular applications.

Satisfying the above criterion over the wing leading edge and the entire region over which laminar flow is desired is sufficient, but not necessary. In particular, downstream of $x=x_1$, the surface roughness level can be larger than $h_{rms}$. Sufficiently far downstream, the allowable roughness level will reach the nominal allowable level, $H_{rms}$. The nominal value of $H_{rms}$ is set by standard (less stringent) criteria for laminar flow associated with TSW transition. The streamwise-varying acceptable level of surface roughness is given by the minimum:

$$h_{rms}(x) < \min[\delta^*(x)\exp(N_0 + n(x) - n^{max}), H_{rms}]$$

where $\delta^*(x)$ is the displacement thickness at x, and $H_{rms}$ is the nominal surface-roughness level. This provides a chordwise distribution for the maximum allowable surface-roughness level at a given spanwise location.

A similar expression can be formulated for surface irregularities other than those associated with surface finish, e.g., those resulting from fasteners. The expressions will be similar to those given for surface roughness, but the coefficients will be different, and may depend on the fastener diameter among other factors. For a given fastener-installation technology, the height of the resulting surface irregularity can be measured and given as a probability distribution. This distribution can be used to identify zones where no fasteners are allowed because they exceed the locally acceptable value. Accordingly, the foregoing expression (or variants of it) can be used to establish zones of maximum roughness, whether the roughness results from surface finish, fasteners, or other features.

In at least some embodiments, the natural-laminar-flow wing produced by the foregoing design process has a geometry that produces allowable growth of SCF in a spatially-compact region, with a variable surface finish at and/or near the leading edge. The surface-finish requirements can be optimized to yield a maximum extent (or targeted extent) of laminar flow, with the maximum allowable rms roughness levels. The wing can also include variable surface-irregularity constraints that provide the maximum surface roughness levels allowable for achieving the desired extent of laminar flow.

Using the foregoing techniques, a designer can either select a chord location and determine the maximum allowable roughness for the surface forward of that location, or the designer can select a maximum allowable roughness and determine the location forward of which such a roughness value must be maintained. The designer can use either approach (or both) in a number of fashions. For example, the designer can perform the foregoing analyses for a variety of $C_p$ distributions and select one that is expected to control both TSW and SCF while integrating properly with other aircraft systems. The foregoing analysis can also be performed at a variety of chordwise locations and/or for a variety of allowable surface roughness values. In other words, the designer can produce an airfoil surface that has more than two levels of surface roughness over a given streamwise cut. One such arrangement is shown in FIG. 5 as discussed below.

Figure 5:
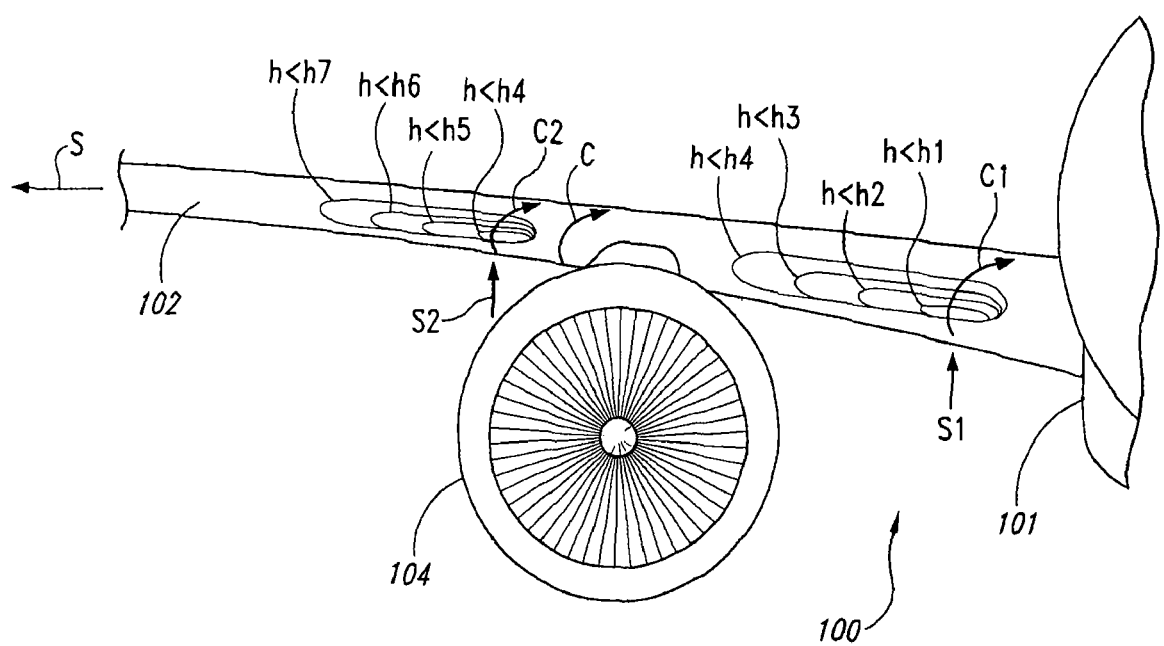
FIG. 5 is a partially schematic, aft-looking view of an aircraft having roughness characteristics distributed over a wing in accordance with an embodiment of the invention.

FIG. 5 illustrates the aircraft 100 with the wing 102 extending outboard from the fuselage 101 in a spanwise direction S and extending aft in a chordwise direction C. Contour lines h indicate regions within which the surface roughness is below a selected value for achieving natural laminar flow, with low h values, e.g., h1, corresponding to low roughness values, and high values, e.g., h7, corresponding to high roughness values. At a first spanwise location S1, a corresponding chordwise cut passes through four roughness values (e.g., roughness values h1, h2, h3 and h4). To control SCF, the surface characteristics of the wing in this region can have roughness values below h1 over a small region near the leading edge, below h2 over a larger region extending aft and outboard, below h3 over a still larger region extending aft and outboard, and below h4 over still a larger region extending aft and outboard. A similar process can be used to establish fastener height and/or other fastener characteristics, leading to a similar family of contours. In such a case, fasteners are accordingly precluded from regions within a particular contour level.

One characteristic of the roughness values shown in FIG. 5 is that the allowable roughness values can increase in a chordwise direction. Accordingly, the manufacturer need not maintain very low roughness values (e.g., h1) over the entire leading edge of the wing, but can instead allow the roughness values to increase e.g., from h1 to h4, in a chordwise direction. An advantage of this arrangement is that it can reduce the cost for manufacturing the wing.

The typical chordwise distribution of the allowable roughness levels has a minimum near the attachment line, increasing to the nominal value over the first 5% of the chord. For a typical transport wing, the level of SCF growth decreases with increasing spanwise location. Accordingly, a representative surface-finish distribution in accordance with several embodiments includes lower allowable roughness levels inboard and higher allowable roughness levels outboard. For example, near the first chordwise cut C1, the roughness values at the leading edge increase from a value h1 to a value h4 in a spanwise direction. At a second chordwise cut C2, located further outboard at spanwise location S2, the allowable surface roughness values are even higher (e.g., ranging from h4 to h7). Accordingly, the manufacturer can not only allow the roughness values to increase in a chordwise direction, but can also allow the roughness values to increase in a spanwise direction. In particular, the roughness values can have more than two levels at any chordwise cut (four are shown in FIG. 5, but more or fewer are used in other embodiments), and the percentage of the chord length over which the roughness values must remain below a selected value decreases as the span increases. An example is seen by comparing the contour for surface roughness value h4 at spanwise location S1 with the chordwise extent for surface roughness value h4 at spanwise location S2. The chordwise extent over which the surface roughness is maintained below h4 is greater at spanwise location S1 than at spanwise location S2.

The manner in which the roughness values change over the surface can depend upon the particular application. For example, in some cases it may be desirable (e.g., cost effective) to have step changes in roughness values in the spanwise and/or chordwise directions. In other cases, it may be more effective to have the roughness values change in a generally continuous and/or monotonic fashion over some or all of the surface, in the spanwise and/or chordwise directions.

Another feature of at least some of the foregoing embodiments is that the surfaces have significant regions of laminar flow without requiring powered devices, such as suction devices, surface cooling devices, or other devices. An advantage of the arrangement is that the impact of achieving laminar flow on overall aircraft fuel efficiency can be improved significantly when compared with active laminar flow systems and hybrid laminar flow systems.

In particular embodiments, the foregoing techniques can be used to produce aircraft wings for high speed, subsonic/transonic commercial jetliners and/or business jets. For example, in particular embodiments, the wings can be configured for cruise flight at a Mach number in the range of from about 0.7 to about 0.9. The target region over which the surface roughness is controlled can produce laminar flow over the forward portion of the wing, from the leading edge to a chord value of from about 15% to about 40% of full chord, and in a particular embodiment, about 30% of full chord. In other embodiments, shaping techniques and/or additional devices can be used to extend the laminar flow region further, in some cases, to the wing trailing edge. In another particular embodiment, the foregoing technique can be used to produce a wing having a significant region of laminar flow, with a leading edge region having a very fine finish, and the rest of the wing having a nominal finish. The leading edge region can extend from the leading edge aft to about 2% of the chord length, over the entire span of the wing on the upper surface and over a similarly sized region on the lower surface of the wing as well. In another embodiment, the 2% value can decrease in the spanwise direction.

From the foregoing, it will be appreciated that specific embodiments of the invention have been described herein for purposes of illustration, but that various modifications may be made without deviating from the invention. For example, while certain embodiments were discussed above in the context of natural laminar flow surfaces, similar techniques can be applied to active systems and/or hybrid systems to improve the efficiency of such systems. Certain aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. An airfoil system, comprising:
    an airfoil surface extending in a chordwise direction and a spanwise direction, the airfoil surface having a variable roughness, the airfoil surface having individual local chord lengths at corresponding spanwise locations; and wherein
    the roughness increases in a chordwise direction; and wherein
    the roughness increases monotonically in a spanwise direction so as to include progressively higher roughness values at progressively greater spanwise locations and a constant percent chord value.

2. The system of claim 1 wherein the roughness increases in a generally continuous manner in the spanwise direction.

3. The system of claim 1 wherein the airfoil surface includes no active laminar flow control devices.

4. The system of claim 1 wherein the airfoil surface includes an upper surface and a lower surface, and wherein the roughness increases in the spanwise direction over the upper surface.

5. The system of claim 1 wherein the airfoil surface is a natural laminar flow airfoil surface at a Mach number of 0.70 or greater.

6. The system of claim 1 wherein the airfoil surface includes a leading edge, and wherein percent chord location is measured in an aft direction from the leading edge.

7. The system of claim 1 wherein the airfoil surface is polished at a forward portion, and wherein roughness at the forward portion results from the polished surface, and wherein the airfoil surface includes an aft portion aft of the forward portion, the aft portion including fasteners, and wherein roughness over the aft portion results from the fasteners.

8. The system of claim 1 wherein the airfoil surface includes no active laminar flow control devices.

9. An airfoil system, comprising:
    an airfoil surface extending in a chordwise direction and a spanwise direction, the airfoil surface having a variable roughness formed by projections extending from the surface; wherein
    at a spanwise location, the roughness has a first value at a first chordwise location, a second value greater than the first value at a second chordwise location greater than the first chordwise location, and a third value greater than the second value at a third chordwise location greater than the second chordwise location, and wherein;
    the roughness increases in an increasing spanwise direction for a given percent chord value; and wherein
    the airfoil surface is not coupled to a suction device to remove air flowing over the airfoil surface.

10. The system of claim 9 wherein the roughness changes in a generally monotonic manner from the first value to the second value and from the second value to the third value.

11. The system of claim 9 wherein the roughness changes in a step manner from the first value to the second value.

12. The system of claim 9 wherein the roughness changes in a step manner from the second value to the third value.

13. The system of claim 9 wherein the airfoil surface has individual chord lengths at corresponding spanwise locations, and wherein the roughness at a given percent chord location increases monotonically in the spanwise direction.

14. The system of claim 9 wherein the airfoil surface includes no active laminar flow control devices.

15. The system of claim 9 wherein the airfoil surface is a natural laminar flow airfoil surface at a Mach number of 0.70 or greater.

* * * * *